United States Patent
Kim (10) Patent No.: US 11,060,970 B2
(45) Date of Patent: Jul. 13, 2021

(54) GAS CONCENTRATION MEASURING DEVICE

(71) Applicant: Chang Hyun Kim, Seoul (KR)

(72) Inventor: Chang Hyun Kim, Seoul (KR)

(*) Notice: Subject to any disclaimer, the term of this patent is extended or adjusted under 35 U.S.C. 154(b) by 487 days.

(21) Appl. No.: 16/063,098

(22) PCT Filed: Dec. 19, 2016

(86) PCT No.: PCT/KR2016/014878
§ 371 (c)(1),
(2) Date: Jun. 15, 2018

(87) PCT Pub. No.: WO2017/105155
PCT Pub. Date: Jun. 22, 2017

(65) Prior Publication Data
US 2020/0278288 A1    Sep. 3, 2020

(30) Foreign Application Priority Data
Dec. 18, 2015 (KR) .................. 10-2015-0181888

(51) Int. Cl.
*G01N 21/3504* (2014.01)
*G01N 21/33* (2006.01)

(52) U.S. Cl.
CPC ......... *G01N 21/3504* (2013.01); *G01N 21/33* (2013.01); *G01N 2201/025* (2013.01); *G01N 2201/062* (2013.01); *G01N 2201/0636* (2013.01)

(58) Field of Classification Search
CPC .............................................. G01N 21/3504

USPC ............................................................ 356/51
See application file for complete search history.

(56) References Cited

U.S. PATENT DOCUMENTS

| | | | | |
|---|---|---|---|---|
| 4,441,815 A * | 4/1984 | Izumi | ...................... | G01J 3/433 250/373 |
| 5,220,402 A * | 6/1993 | Harvey | ................ | G01N 21/031 356/246 |
| 6,682,216 B1 * | 1/2004 | Small, IV | ................. | G01J 5/08 374/126 |

(Continued)

FOREIGN PATENT DOCUMENTS

| | | | | |
|---|---|---|---|---|
| EP | 2693198 A2 * | 2/2014 | ............ | G01N 21/33 |
| JP | 07181128 A | 7/1995 | | |
| JP | 2013541019 A | 11/2013 | | |

(Continued)

*Primary Examiner* — Tarifur R Chowdhury
*Assistant Examiner* — Omar H Nixon
(74) *Attorney, Agent, or Firm* — Novick, Kim & Lee, PLLC; Sang Ho Lee (57) ABSTRACT

A gas concentration measurement device is disclosed. The gas concentration measurement device comprises: a light source unit for emitting light into the gas concentration measurement device; an incident unit for refracting the light emitted from the light source unit; a first reflection unit and a second reflection unit for reflecting the incident light; a rotatable third reflection unit; and a light receiving unit for measuring the amount of incident light, wherein the light incident from the incident unit is reflected between the first reflection unit and the second reflection unit through the third reflection unit, and the light is incident on the light receiving unit by allowing an optical path thereof to be changed according to the rotation of the third reflection unit.

10 Claims, 11 Drawing Sheets

(56) References Cited

U.S. PATENT DOCUMENTS

2008/0159341 A1* 7/2008 Patel .................. G01N 21/1702
                                                            372/20
2014/0105238 A1* 4/2014 Kurosu .................. H01S 3/041
                                                            372/58

FOREIGN PATENT DOCUMENTS

| KR | 101256381 B1 | 4/2013 |
| KR | 1020130061776 A | 6/2013 |
| KR | 1020150072793 A | 6/2015 |

* cited by examiner

GAS CONCENTRATION MEASURING DEVICE

FIELD OF THE INVENTION

The present invention relates to a gas concentration measuring device, and more particularly, to a gas concentration measuring device, which can extend the length of an optical path for measuring gas concentration using a plurality of reflectors, thereby accurately measuring gas concentration and being miniaturized.

BACKGROUND OF THE INVENTION

An optical gas sensor technology uses the characteristics that gases consisting of different atoms, for instance, CO, $CO_2$, $CH_4$, NO, $NO_2$, $SO_2$, $NH_3$, acetone, and so on, absorb light of a unique and specific wavelength range of each molecule, and is a way of measuring gas concentration by measuring and calculating a light absorption rate per wavelength ranges of gases.

Because the light absorption rate of gas is proportional to gas concentration, the major key of an optical gas sensor is to accurately measure the light absorption rate of gas. Therefore, the optical gas sensor basically includes a light source and a photodetector, and has a structure having an optical cavity for raising the light absorption rate.

The mechanism that a gas molecule absorbs light is as follows. In general, a gas molecule forms various energy levels and is changed from a ground state into an excited state by absorbing photons having energy resonating with such energy levels.

Gas molecules have the property to selectively absorb only energy corresponding to vibrational energy quantum, and generally absorbs light of an infrared zone as vibrational energy. For such a reason, $CO_2$, CO, $CH_4$, $C_3H_8$ and the likes have their own absorption spectrum. For instance, $CO_2$ absorbs the wavelength of 4.25 µm, CO absorbs the wavelength of 4.7 µm, $CH_4$ absorbs the wavelength of 3.3 µm, and the level to absorb light is varied depending on the concentration of the corresponding gas.

Such a light absorption rate is changed according to gas molecules, for instance, carbon dioxide has the light absorption rate as high as to be called greenhouse gas, but carbon monoxide has low light absorption rate. An absorption rate of a photon is defined as an absorption rate per mole. In general, a gas sensor for sensing gas with a high absorption rate is low in technological difficulty, but a gas sensor for sensing gas with a low absorption rate is high in technological difficulty.

However, even in the case of the gas with the low absorption rate, if the number of times that gas molecules come into contact with photons is increased, the absorption rate is increased. One among methods for increasing the number of times that gas molecules contact with photons is to make the optical path in the optical cavity longer, and it can be confirmed from the Beer-Lambert theory, which is an optical gas sensor interpretation theory.

When the quantity of light detected by the photodetector in a state where there is no gas molecule is $I_o$, gas concentration is X, the length of the optical path where the light is in contact with the gas from the light source to the photodetector is L, and a unique absorption rate of the gas molecule is b, the Beer-Lambert theory provides the following relation equation between gas concentration and the quantity of light I arriving at a photodetector.

$$I = I_0 \exp^{-bLX} \quad \text{[Equation 1]}$$

The Beer-Lambert theory shows that the value I for the same concentration becomes smaller when the length of the optical path L becomes larger and a variable range of the value I for the same concentration change becomes larger when the length of the optical path L becomes larger and it is possible to manufacture a more precise sensor.

In the meantime, an effective optical cavity must have a structure for extend the optical path and raise optical efficiency. Because light emitted from a light source is generally radiated in all directions, lots of light does not contribute to detection of gas concentration and goes to waste. However, if a light concentration characteristic of the optical cavity is raised, the quantity of wasted light can be reduced and optical efficiency is raised.

As can be seen from the above equation, the larger the value $I_o$ is, the higher optical efficiency is, and because the variable range of the value I with respect to the change in the same concentration is large, it makes production of more accurate sensors possible. Finally, in production of the optical cavity, extension of the length of the optical path and miniaturization of the size and raising of optical efficiency may determine competitive power of optical gas sensors.

SUMMARY OF THE INVENTION

Technical Problem

Accordingly, the present invention has been made in view of the above-mentioned problems occurring in the prior art, and it is an object of the present invention to provide a gas concentration measuring device, which can extend the length of an optical path for measuring gas concentration using a plurality of reflectors, thereby accurately measuring gas concentration and being miniaturized.

Technical Solution

To accomplish the above object, according to the present invention, there is provided a gas concentration measuring device including: a light source unit for emitting light into the gas concentration measuring device; an incident unit for refracting the light emitted from the light source unit; a first reflection unit and a second reflection unit for reflecting incident light; a rotatable third reflection unit;

and a light receiving unit for measuring the quantity of incident light, wherein the light incident from the incident unit is reflected between the first reflection unit and the second reflection unit through the third reflection unit, and is incident on the light receiving unit because an optical path of the light is changed due to the rotation of the third reflection unit.

Moreover, the light reflected from the first reflection unit and the light reflected from the second reflection unit pass a same point.

Furthermore, the first reflection unit, the second reflection unit and the third reflection unit are formed in one among an oval, a circle, a parabola, and a plane.

Additionally, a focus of the first reflection unit and a focus of the second reflection unit are located on a reflective surface of the third reflection unit.

In addition, the first reflection unit is formed in a plane shape, and the gas concentration measuring device further includes a condensing lens arranged between the first reflection unit and the second reflection unit.

Moreover, a focus of the condensing lens is located on the reflective surface of the third reflection unit.

Furthermore, the gas concentration measuring device further includes a control unit for controlling an incident angle of the light emitted into the gas concentration measuring device differently according to wavelengths of light emitted into the gas concentration measuring device.

Additionally, the light source unit includes a plurality of optical devices for emitting lights with different incident angles and different wavelengths.

Moreover, the incident unit comprises an optical dispersion compensation unit to minimize dispersion of the light emitted from the light source unit by wavelength.

Furthermore, the first reflection unit and the second reflection unit are formed in a single circular shape, and the focus of the first reflection unit and the focus of the second reflection unit coincide with each other.

Additionally, the gas concentration measuring device further includes a control unit for rotating the third reflection unit within a predetermined driving range from when the light is emitted to the inside of the gas concentration measuring device to when the light emitted into the gas concentration measuring device is outputted to the light receiving unit.

As described above, the gas concentration measuring device according to an embodiment of the present invention can extend the length of an optical path for measuring gas concentration using a plurality of reflectors, thereby accurately measuring gas concentration and being miniaturized.

DETAILED DESCRIPTION OF THE PREFERRED EMBODIMENT

Hereinafter, reference will be now made in detail to the preferred embodiments of the present invention with reference to the attached drawings. For convenience in description, an infrared gas concentration measuring device is illustrated. However, the present invention is not limited to the infrared gas concentration measuring device, and may be applied to other gas concentration measuring devices using other light sources besides infrared rays.

In the drawings, thicknesses of lines and sizes of constituent elements may be exaggerated for clarity and convenience in explanation. In addition, the terms described below are defined in consideration of the functions of the present invention, which may vary depending on the intention or custom of the user, the operator. Therefore, the definition of these terms should be based on the contents throughout the specification.

Figure 1A:
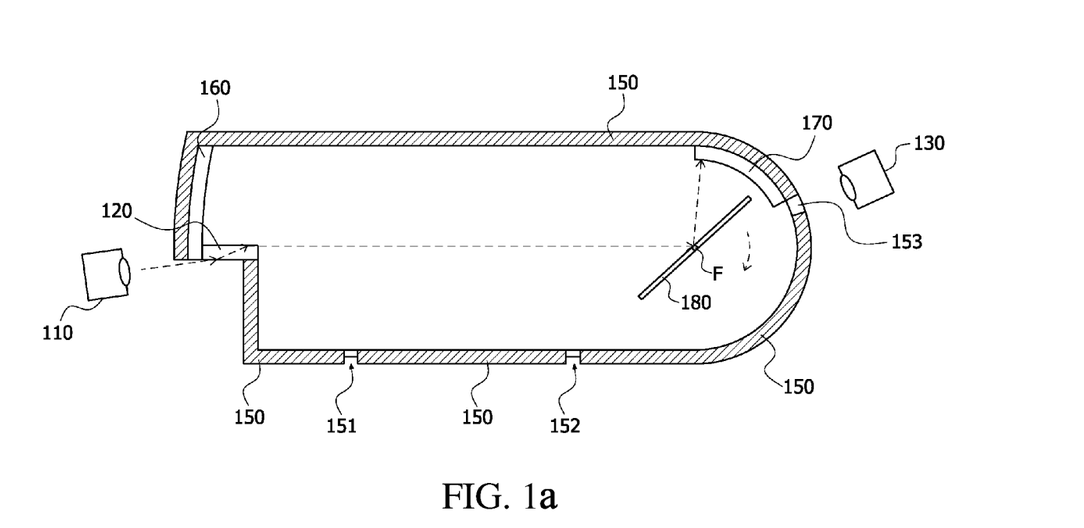
FIGS. 1A to 1C are views showing a gas concentration measuring device according to an embodiment of the present invention.
Figure 1B:
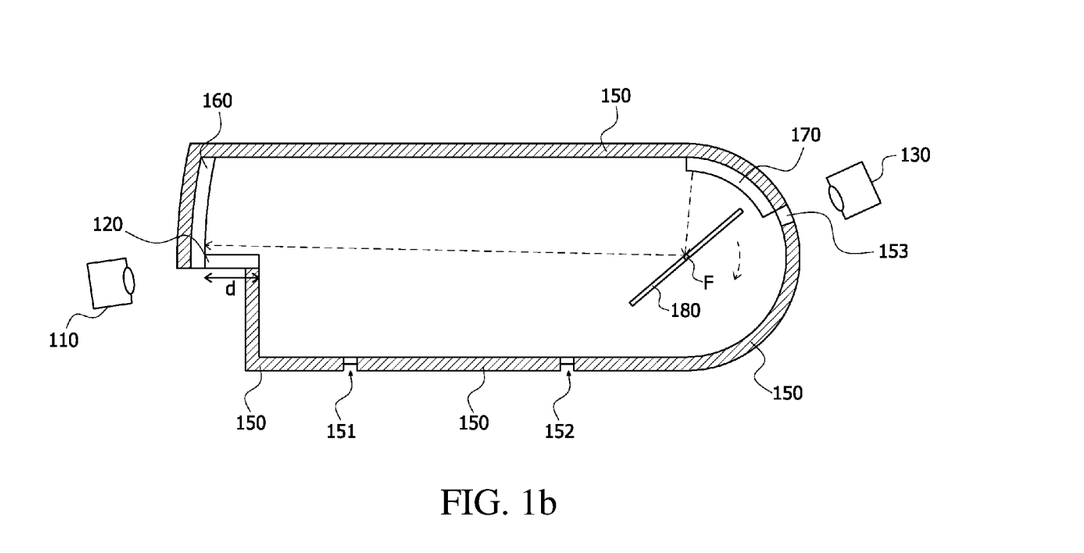
Figure 1C:
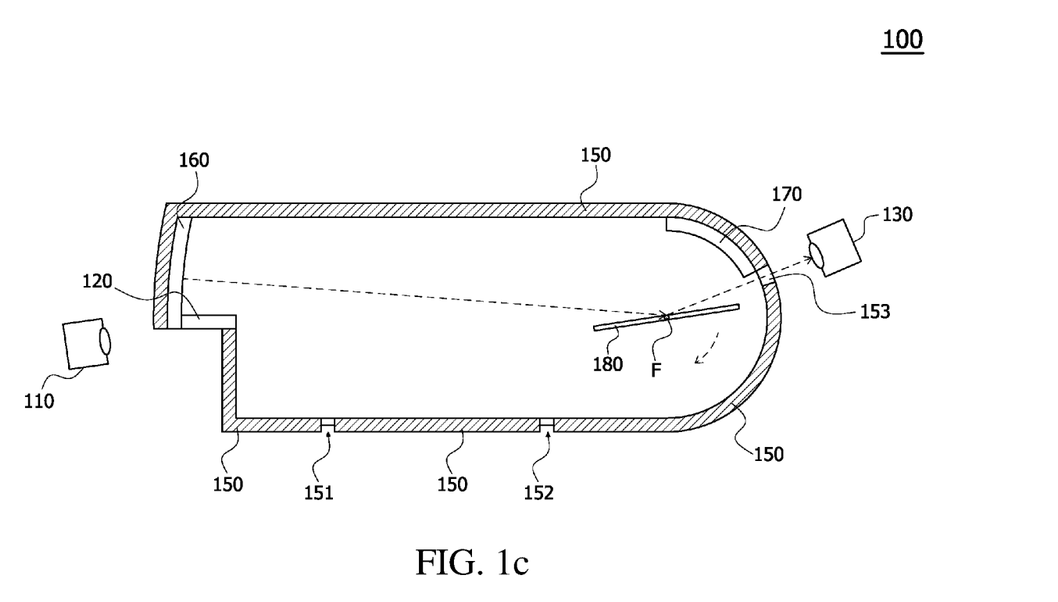

FIGS. 1A to 1C are transverse cross-sectional views showing a gas concentration measuring device according to an embodiment of the present invention.

Referring to FIG. 1A, the gas concentration measuring device 100 according to the embodiment of the present invention may include a light source unit 110, an incident unit 120, a light receiving unit 130, a chamber unit 150, a first reflection unit 160, a second reflection unit 170, and a third reflection unit 180.

The light source unit 110 may emit light to the inside of the gas concentration measuring device 100 by a power supply. That is, the light source unit 110 may emit light to the incident unit 120 at a predetermined angle. An angle of light emitted by the light source unit 110 may be set in such a way that light emitted to the inside of the chamber unit 150 after passing through the incident unit 120 faces a focus F of the second reflection unit 170. An incident angle of light emitted from the light source unit 110 to the incident unit 120 may be set using the characteristic that an incident angle and a refracting angle of light are changed caused by a difference in a refractive index between different materials according to the Snell's law and in consideration of the wavelength of a light source used for measurement of gas concentration. The refracting angle shown in FIG. 1A is illustrative and the present invention is no limited to it.

The light source unit 110 may include at least one among an infrared light emitting diode, an infrared lamp and an ultraviolet lamp. Moreover, the light source unit 110 may further include a light collector for emitting light parallel at a predetermined angle.

As shown in FIG. 1A, the incident unit 120 may refract light emitted from the light source unit 110 and make it face the third reflection unit 180. The light refracted through the incident unit 120 may face the focus F. In order to reduce loss of light, the incident unit 120 may be made of a material with high light transmissivity. Furthermore, the incident unit 120 may be made of a material with less dispersion according to wavelengths.

According to embodiments, like the curvature of the first reflection unit 160, curvature of the incident unit 120 may be designed as a parabola, which is a part of a circle with a radius that is a distance from one side of the incident unit 120 to the focus F, around the focus F. The incident unit 120 may have the same area as the first reflection unit 160, but the present invention is not limited to the above. The incident unit 120 may be changed in area, thickness, width and height according to its design. The incident unit 120 may seal the inside of the chamber unit 150 so that gas induced into the chamber unit 150 does not escape to the outside.

In the meantime, if the wavelength range of the used light is narrow, namely, in the case that light with a specific wavelength range like laser is used, a distance between the first reflection unit 160 and the focus F, a distance between the second reflection unit 170 and the focus F, and a thickness of the incident unit 120 may be designed not to cause destructive interference of light based on the wavelength of the used light.

The light receiving unit 130 may measure the quantity of incident light after light was emitted from the light source unit 110 and passed through the chamber unit 150. The light receiving unit 130 may be one among light amount measuring devices of various forms as known by those skilled in the art.

The chamber unit 150 may be formed by a hollow housing into which gas flows and from which gas is discharged out. The chamber unit 150 may include a gas inlet 151, a gas outlet 152, and a light output hole 153. Gas may be induced through the gas inlet 151 of the chamber unit 150, and the induced gas may be discharged out through the gas outlet 152. According to embodiments, the gas inlet 151 may have a dust filter and a moisture filter to remove foreign matters from the induced gas so as to enhance precision in measurement of gas. As shown in FIG. 1A, the gas inlet 151 and the gas outlet 152 may have shields, which slidably act to prevent an escape of gas.

The light output hole 153 may be formed at one side of the chamber unit 150 so that light can arrive at the light receiving unit 130 from the chamber unit 150. In order to reduce loss of light, the light output hole 153 may be made of a material with high transmissivity. For convenience, in FIG. 1A, it is illustrated that the light output hole 153 is located on one side of the second reflection unit 170, but the present invention is not limited to it. The gas inlet 151, the gas outlet 152 and the light output hole 153 may be formed at various positions according to designs.

The first reflection unit 160 may be designed as a parabola, which is a part of a circle with a radius that is a distance from one side of the first reflection unit 160 to the focus F, around the focus F. In order to reduce loss of light, the first reflection unit 160 may be formed of a material with a high reflection rate of light, and may be coated in order to increase reflectivity. According to the properties of light, light vertically incident on the first reflection unit 160 after passing the focus F is reflected vertically and faces the focus F. According to embodiments, as shown in FIG. 1A, the first reflection unit 160 may be attached to the inside of the chamber unit 150. Additionally, the first reflection unit 160 may be extended to the rear of the incident unit 120 as shown in FIG. 1A in order to reflect light incident on the incident unit 120 after being reflected from the third reflection unit 180.

The second reflection unit 170 may be designed as a parabola, which is a part of a circle with a radius that is a distance from one side of the second reflection unit 170 to the focus F, around the focus F. In order to reduce loss of light, the second reflection unit 170 may be formed of a material with a high reflection rate of light, and may be coated in order to increase reflectivity. According to the properties of light, light vertically incident on the second reflection unit 170 after passing the focus F is reflected vertically and faces the focus F. According to embodiments, as shown in FIG. 1A, the second reflection unit 170 may be attached to the inside of the chamber unit 150. Moreover, according to embodiments, a distance between the first reflection unit 160 and the focus F and a distance between the second reflection unit 170 and the focus F may be changed in various ways.

In the gas concentration measuring device 100 according to the embodiment of the present invention, the light reflected from the first reflection unit 160 and the light reflected from the second reflection unit 170 may face the third reflection unit 180. For instance, the light reflected from the first reflection unit 160 and the light reflected from the second reflection unit 170 may pass the same point. That is, the focus F that the light reflected from the first reflection unit 160 faces and the focus F that the light reflected from the second reflection unit 170 faces may be formed at the same point. As an example, the focus F of the first reflection unit 160 and the focus F of the second reflection unit 170 may be located on a reflective surface of the third reflection unit 180.

The third reflection unit 180 may be connected with a driving unit (not shown) which rotates the third reflection unit 180. In order to reduce loss of light, the third reflection unit 180 may be formed of a material with high reflection rate of light. In an embodiment of the present invention, the driving unit is to rotate the third reflection unit 180 connected to a driving shaft by rotating the driving shaft by an applied power supply, and may be one among a stepping motor, a DC motor, and an induction motor. The driving shaft may be joined to the center of the third reflection unit 180.

In the meantime, the gas concentration measuring device 100 according to the embodiment of the present invention may further include a control unit (not shown) for controlling operation of the gas concentration measuring device 100. The control unit may control an angle of the third reflection unit 180 so that the light reflected from the third reflection unit 180 faces the second reflection unit 170 when it is started to emit light to measure gas.

Referring to FIG. 1A, the light emitted from the light source unit 110 may be refracted at the bottom surface and the top surface of the incident unit 120 and may be irradiated to the inside of the chamber unit 150. According to embodiments, the light emitted from the light source unit 110 may be refracted at the bottom surface of the incident unit 120 and may be irradiated to the inside of the chamber unit 150. The light irradiated to the inside of the chamber unit 150 through the incident unit 120 may be reflected by the third reflection unit 180 located at the focus F, and may face the second reflection unit 170. For instance, the control unit controls the driving unit to rotate the third reflection unit 180 so that an angle of the third reflection unit 180 is adjusted such that an incident angle of light toward the third reflection unit 180 reaches 45 degrees. Therefore, the light reflected from the third reflection unit 180 faces the second reflection unit 170. However, an initial angle of the third reflection unit 180 is not limited to the above.

Next, referring to FIG. 1B, the light reflected by the second reflection unit 170 may face the third reflection unit 180 located at the focus F, and the third reflection unit 180 may be rotated at a predetermined angle by the control unit in the meantime. Because the third reflection unit is rotated at the predetermined angle while the light reflected from the third reflection unit 180 is reflected on the second reflection unit 170 and reaches the third reflection unit 180 again, the path of the light reflected in the direction of the incident unit 120 from the third reflection unit 180 illustrated in FIG. 1B may differ from the path of the light incident on the third reflection unit 180 from the incident unit 120 illustrated in FIG. 1A. According to embodiments, the light reflected by the second reflection unit 170 is reflected from the third reflection unit 180, passes the incident unit 120, and then, faces the first reflection unit 160.

Because the third reflection unit 180 is rotated while reflection of light by the first reflection unit 160, the second reflection unit 170 and the third reflection unit 180 is repeated, the light reflected by the first reflection unit 160 finally faces the third reflection unit 180 and the focus F as shown in FIG. 1C, and the light reflected by the third reflection unit 180 located at the focus F is controlled to face the light output hole 153. That is, the light incident from the incident unit 120 is reflected between the first reflection unit 160 and the second reflection unit 170 through the third reflection unit 180, and is incident on the light receiving unit 130 because the optical path is changed due to the rotation of the third reflection unit 180. FIGS. 1A to 1C illustrate that the light incident from the incident unit 120 reaches the light receiving unit 130 through the light output hole 153 after being reflected from the third reflection unit 180, the second reflection unit 170, the third reflection unit 180, the first reflection unit 150 and the third reflection unit 180 in order, but it is illustrated just as an example and the number of reflections of the light incident onto the inside of the chamber unit 150 may be changed according to the size of the chamber unit 150 and the speed of rotation of the third reflection unit 180.

The control unit may control the rotation of the driving unit in order to adjust a path that light comes into contact with gas. The control unit according to the embodiment of the present invention may control the third reflection unit 180 to rotate at a constant speed, but the present invention is not limited to it. That is, the control unit may control the rotation speed of the driving unit regularly or irregularly.

Furthermore, the control unit may rotate the third reflection unit 180 within a predetermined driving range from when the light is incident on the chamber unit 150 which is the inside of the gas concentration measuring device 100 to when the light emitted to the inside of the gas concentration measuring device 100 is outputted to the light receiving unit 130 through the light output hole 153. That is, the control unit may repeatedly rotate the driving unit in the clockwise direction or in the counterclockwise direction within the predetermined driving range. In this instance, the predetermined driving range may be selected from the angle of the third reflection unit 180 that the light reflected by the third reflection unit 180 does not face the light output hole 153 but is reflected on the second reflection unit 170. If the driving unit is rotated within the predetermined driving range, the light does not travel back and forth the same path between the first reflection unit 160 and the third reflection unit 180. Because the third reflection unit 180 is rotated while the light facing the focus F from the first reflection unit 160 is reflected from the third reflection unit 180, is reflected on the second reflection unit 170 and returns to the focus F, the reflection angle at the third reflection unit 180 is changed before and after the light is reflected on the second reflection unit 170.

Moreover, the control unit may control the length of the path that the light comes into contact with gas based on time that the light comes into contact with gas. The length of the optical path is related to time spent until the light is outputted through the light output hole 153 after being incident onto the chamber unit 150 through the incident unit 120. In FIG. 1A, if the speed of light is c, the time required for the light to reach the light output hole 153 from the incident unit 120 is t, a distance between the first reflection unit 160 and the third reflection unit 180 is r1, a distance between the second reflection unit 170 and the third reflection unit 180 is r2, the thickness of the incident unit 120 is d, and a refractive index of the incident unit 120 is $n_d$, the optical path L is approximately calculated as the following equation because the speed of light $V_d$ in the incident unit 120 is $(c/n_d)$.

$$L = \frac{t}{\frac{d}{\frac{c}{n_d}} + \frac{r_1 + r_2 - d}{c}} \times (r_1 + r_2 - d)$$ [Equation 2]

$$= \frac{t}{\frac{r_1 + r_2 + (n_d - 1)d}{c}} \times (r_1 + r_2 - d)$$

$$= \frac{(r_1 + r_2 - d)}{r_1 + r_2 + (n_d - 1)d} \times c \times t$$

The optical path may be changed little by little according to lengths and materials of the incident unit 120, and the relationship between the optical path and the measurement time is not limited to the above equation. Once the optical path L is known, concentration of the gas ingredients can be known through the Beer-Lambert theory. According to embodiments, it is possible to create a look-up table on relation between the time required t and concentration of the gas ingredients through experimentation in order to use it conveniently.

Additionally, the control unit may set different lengths of the optical path according to kinds of gases to be measured. For instance, the control unit may make the optical path short if concentration of gas to be measured is high but make the optical path long if concentration of gas to be measured is low. In addition, when the optical path with respect to the same concentration change is longer, gas concentration can be measured more accurately. The control unit may adjust the reflection angle of the light facing the focus F from the first reflection unit 160 by rotating the third reflection unit 180 after the time set according to the length of the optical path has elapsed, in order to control the light reflected by the third reflection unit 180 located at the focus F to face the light output hole 153.

Figure 2A:
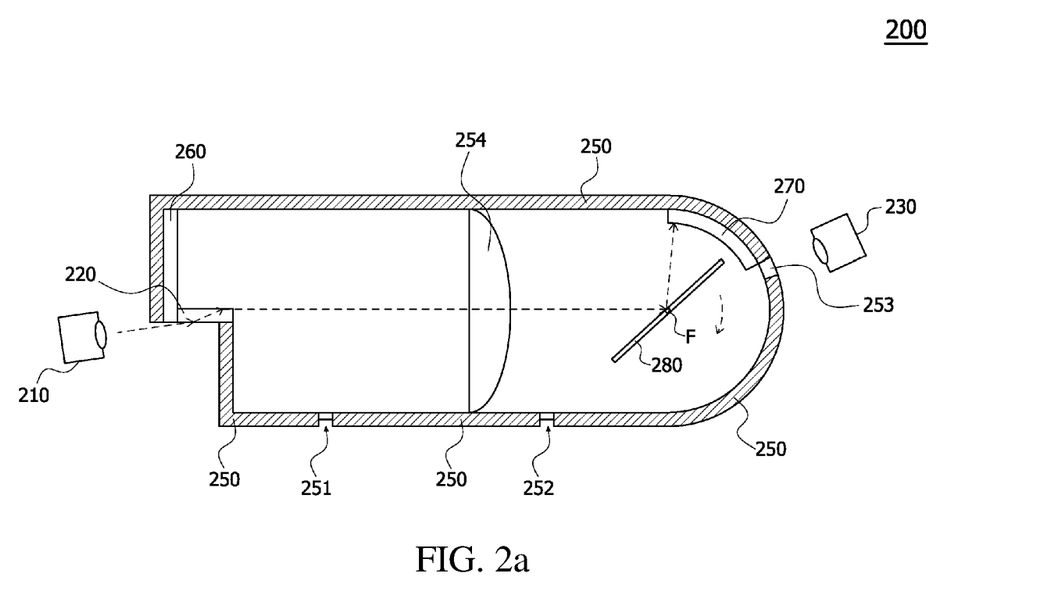
FIGS. 2A to 2C are views showing a gas concentration measuring device according to another embodiment of the present invention.
Figure 2B:
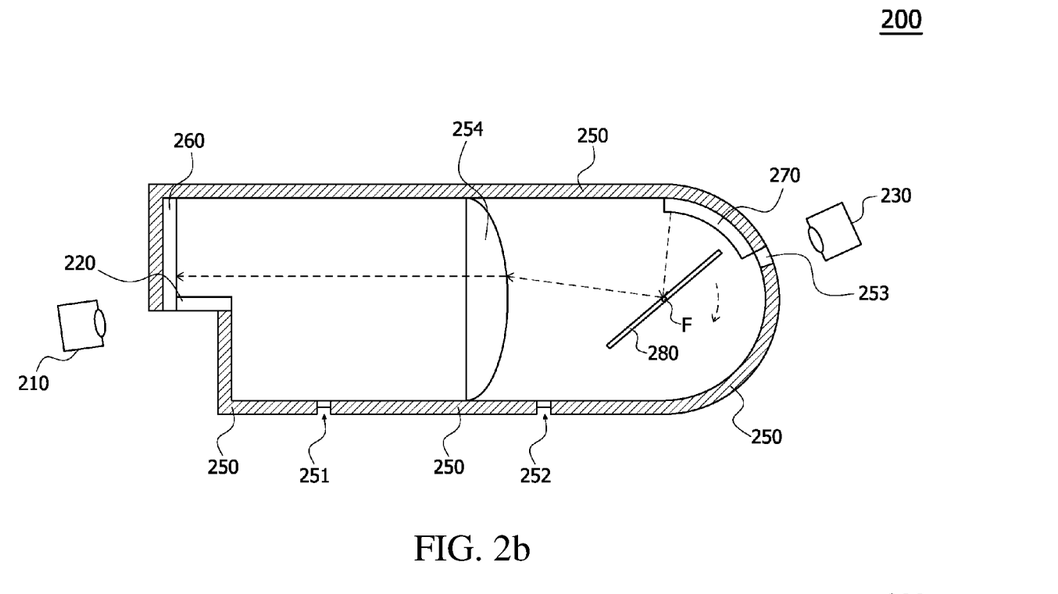
Figure 2C:
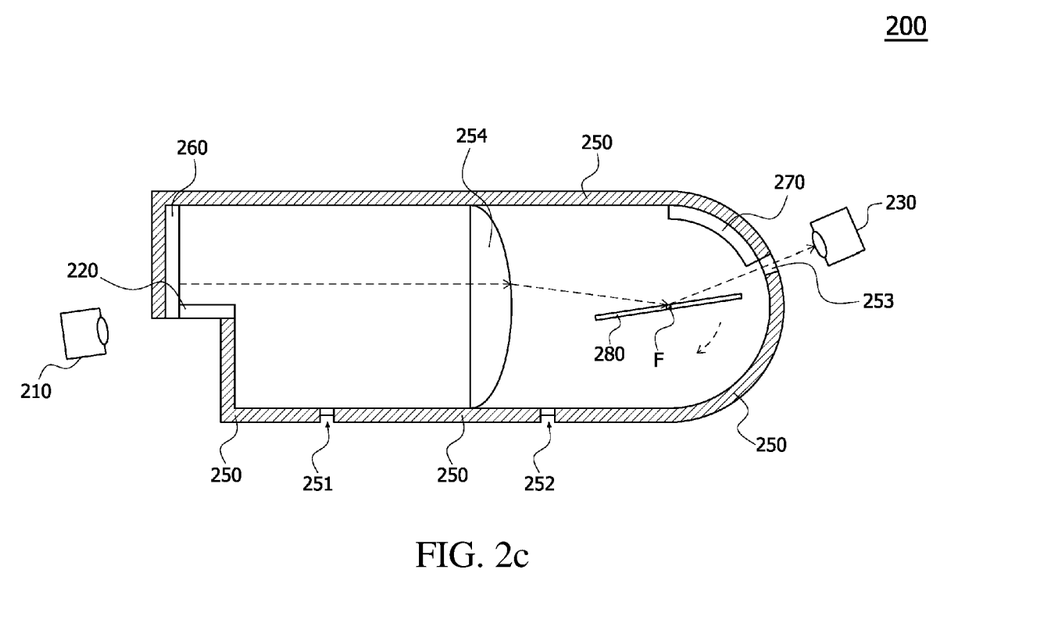

In the meantime, according to embodiments, the first reflection unit 160, the second reflection unit 170 and the third reflection unit 180 may be any one among an oval, a circle, a parabola, and a plane. In FIG. 1, the first reflection unit 160 and the second reflection unit 170 are formed to have parabolic shapes formed around the focus F and having different radiuses, but the present invention is not limited to the above. FIGS. 2A to 2C illustrate the plane-shaped first reflection unit 160, and its detailed description will be omitted.

FIGS. 2A to 2C are views showing a gas concentration measuring device according to another embodiment of the present invention. Referring to FIG. 2A, the gas concentration measuring device 200 according to another embodiment of the present invention may include a light source unit 210, an incident unit 220, a light receiving unit 230, a chamber unit 250, a first reflection unit 260, a second reflection unit 270, and a third reflection unit 280. Because the light source unit 210, the incident unit 220, the light receiving unit 230, the chamber unit 250, the first reflection unit 260, the second reflection unit 270, and the third reflection unit 280 are similar to the light source unit 110, the incident unit 120, the light receiving unit 130, the chamber unit 150, the first reflection unit 160, the second reflection unit 170, and the third reflection unit 180 illustrated in FIG. 1A, their detailed descriptions will be omitted.

Referring to FIG. 2A, in the gas concentration measuring device 200 according to another embodiment of the present invention, the first reflection unit 260 may be plane-shaped. In this instance, because the third reflection unit 280 is rotated while the light facing the focus F from the first reflection unit 260 is reflected from the third reflection unit 280, is reflected on the second reflection unit 270 and returns to the focus F, the reflection angle at the third reflection unit 280 is changed before and after the light is reflected on the second reflection unit 270 so that the optical path is changed. In order to compensate for changes of the optical path of the light facing the first reflection unit 260, the gas concentration measuring device 200 may further include a condensing lens 254 for collecting parallel light at the focus F and directing the light passing the focus F to the first reflection unit 260 in parallel. The condensing lens 254 is arranged between the first reflection unit 260 and the second reflection unit 270, and is made of a material with high transmissivity. A focus of the condensing lens 254 may be located on the reflection surface of the third reflection unit 280, or may be the same as the focus F of the first reflection unit 260 and the second reflection unit 270.

Referring to FIG. 2A, the light irradiated into the chamber unit 250 through the incident unit 220 is reflected by the third reflection unit 280 located at the focus F after passing the condensing lens 254, and then, faces the second reflection unit 270.

Next, referring to FIG. 2B, the light reflected by the second reflection unit 270 may be reflected by the third reflection unit 280 located at the focus F and pass the condensing lens 254, may be refracted by the condensing lens 254 and be vertically incident on the first reflection unit 260. Because the third reflection unit 280 is rotated at a predetermined angle by the control unit while the light is reflected by the second reflection unit 270, the path of the light incident on the third reflection unit 280 from the incident unit 220 may be different from the path of the light which has been reflected at the third reflection unit 280 and faces the first reflection unit 260.

Next, referring to FIG. 2C, the light reflected by the first reflection unit 260 is refracted while passing the condensing lens 254, and then, faces the third reflection unit 280 and the focus F. The control unit rotates the third reflection unit 280 to control the reflection angle of the light facing the focus F from the first reflection unit 260, so that the light reflected by the third reflection unit 280 located at the focus F faces a light output hole 253.

Therefore, the light receiving unit 230 can measure the quantity of incident light after light was emitted from the light source unit 210 and passed through the chamber unit 250. The gas concentration measuring device 200 according to another embodiment of the present invention may further include the control unit (not shown) for controlling the operation of the gas concentration measuring device 200 as described referring to FIGS. 1A and 1C. FIGS. 2A to 2C illustrate that the light faces the light output hole 253 after being reflected from the third reflection unit 280 three times, but the number of reflections of the light from the third reflection unit 280 may be more in consideration of the speed of light and the size of the chamber unit 250.

Figure 3:
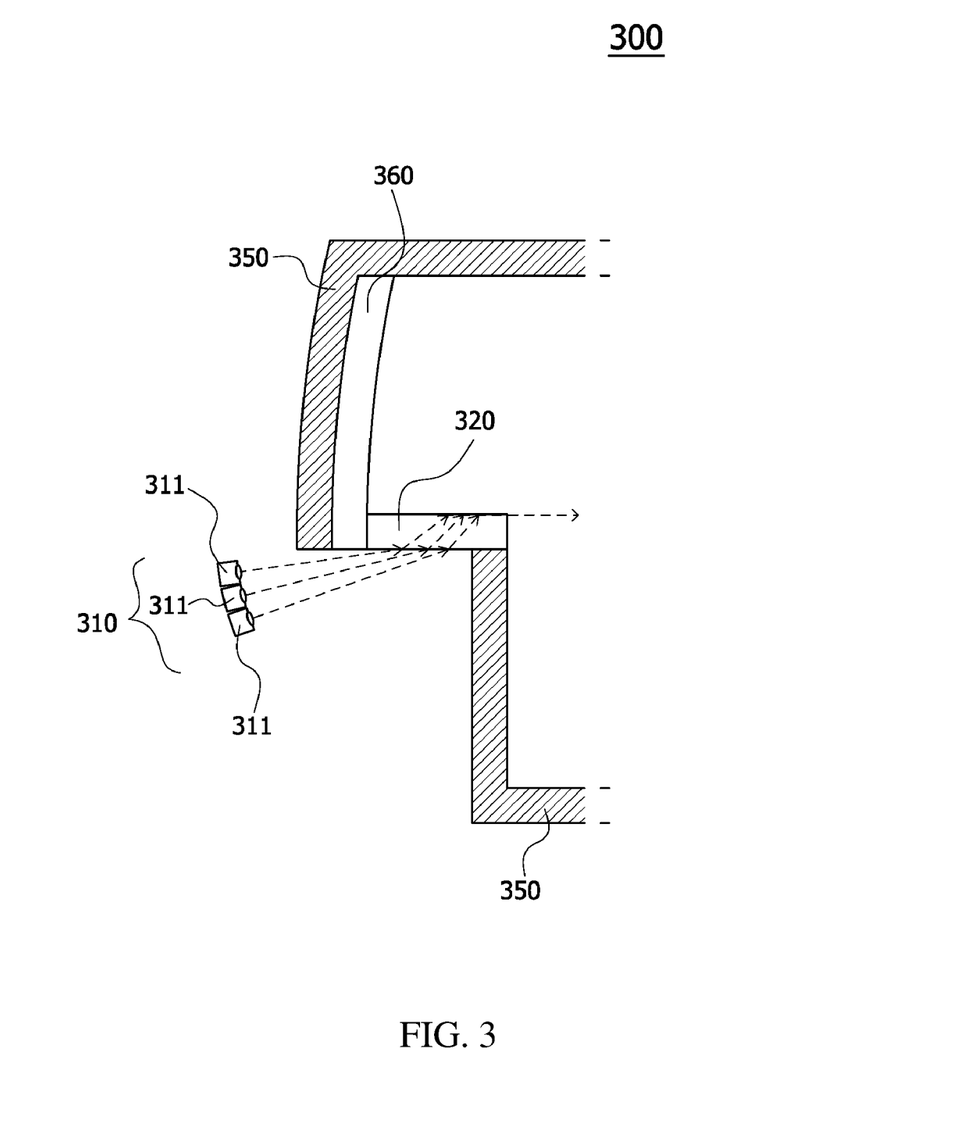
FIG. 3 is a view showing a gas concentration measuring device according to another embodiment of the present invention.

FIG. 3 is a view showing a gas concentration measuring device according to another embodiment of the present invention. Referring to FIG. 3, the gas concentration measuring device 300 according to another embodiment of the present invention may include a light source unit 310, an incident unit 320, a chamber unit 350, and a first reflection unit 360, and not shown in FIG. 3, but may further include a light receiving unit, a second reflection unit, a third reflection unit, and a control unit as described referring to FIGS. 1A to 2C. Because the incident unit 320, the chamber unit 350, and the first reflection unit 360 are similar to the incident unit 120, the chamber unit 150, and the first reflection unit 160 illustrated in FIG. 1A, their detailed descriptions will be omitted.

Referring to FIG. 3, in the gas concentration measuring device 300 according to another embodiment of the present invention, the light source unit 310 may include a plurality of optical devices 311 for emitting lights with different incident angles and different wavelengths. If the wavelength range of light used for measurement of gas is wide, there are different refractive indexes by wavelengths. Therefore, as shown in FIG. 3, the light source unit 310 has a structure that the plurality of optical devices 311 are arranged in an array to emit lights with different wavelength ranges to the incident unit 320 at different angles. For instance, as shown in FIG. 3, the lights emitted from the plurality of optical devices 311 are refracted differently from each other while passing the incident unit 320, and face the third reflection unit along the same optical path.

Figure 4:
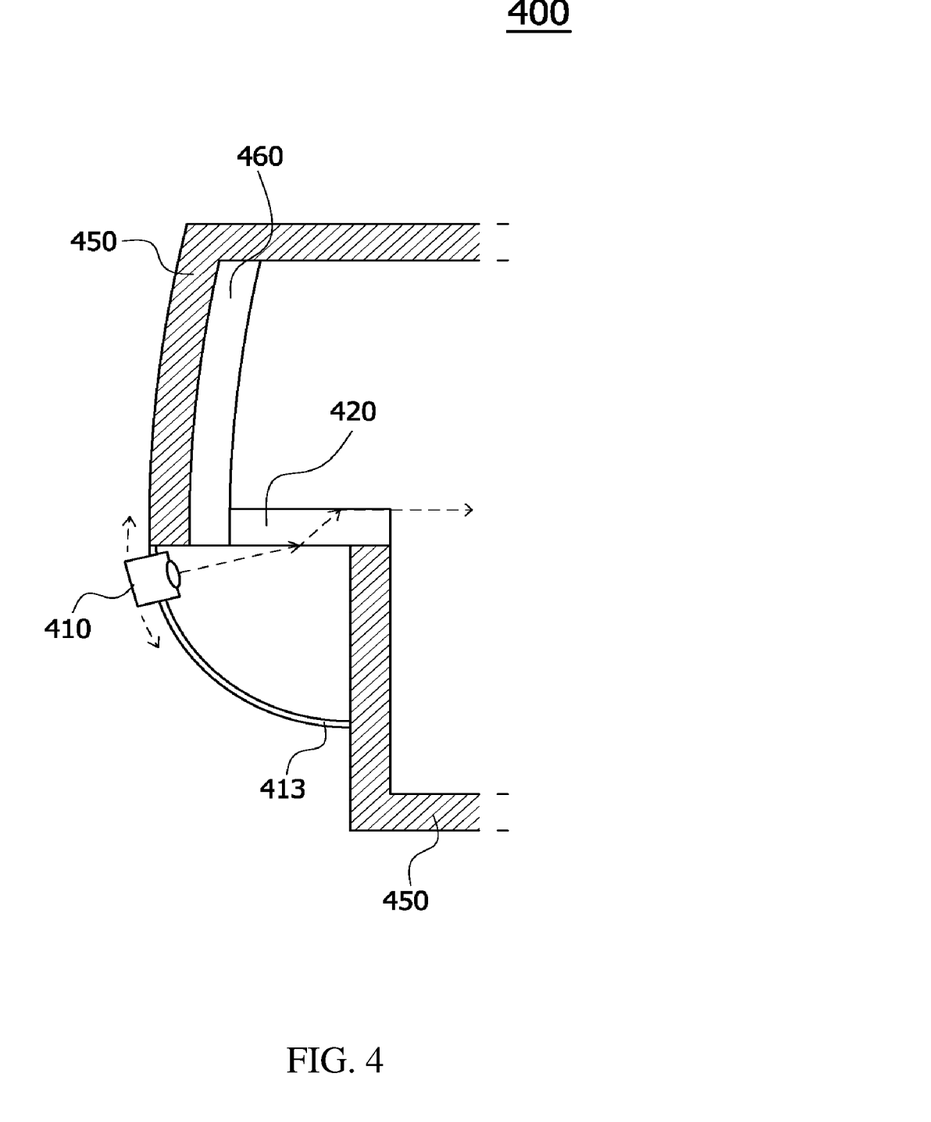
FIG. 4 is a view showing a gas concentration measuring device according to another embodiment of the present invention.

FIG. 4 is a view showing a gas concentration measuring device according to another embodiment of the present invention. Referring to FIG. 4, the gas concentration measuring device 400 according to another embodiment of the present invention may include a light source unit 410, an incident unit 420, a chamber unit 450, and a first reflection unit 460, and not shown in FIG. 4, but may further include a light receiving unit, a second reflection unit, a third reflection unit, and a control unit as described referring to FIGS. 1A to 2C. Because the incident unit 420, the chamber unit 450, and the first reflection unit 460 are similar to the incident unit 120, the chamber unit 150, and the first reflection unit 160 illustrated in FIG. 1A, their detailed descriptions will be omitted.

The gas concentration measuring device 400 according to another embodiment of the present invention may further include an incident angle control unit 413 for changing an angle to emit light to the incident unit 420 according to the wavelength of the light used. For instance, as shown in FIG. 4, the incident angle control unit 413 may be in the form of a rail on which the light source unit 410 is movable. Moreover, according to embodiments, the incident angle control unit 413 may have one of various forms to control the incident angle of the light emitted from the light source unit 410 to the incident unit 420.

The control unit can control the incident angle of the light emitted to the inside of the gas concentration measuring device 400 according to the wavelengths of the light emitted to the inside of the gas concentration measuring device 400. As an example, the control unit selects the wavelength range of light suitable for measurement according to properties of a gas to be measured, and decides the incident angle so that a refractive angle at the incident unit 420 becomes 90 degrees according to the refractive index of the corresponding wavelength range. The control unit controls the incident angle control unit 413 according to the decided incident angle to control the incident angle by rotating or moving the light source unit 410.

Figure 5A:
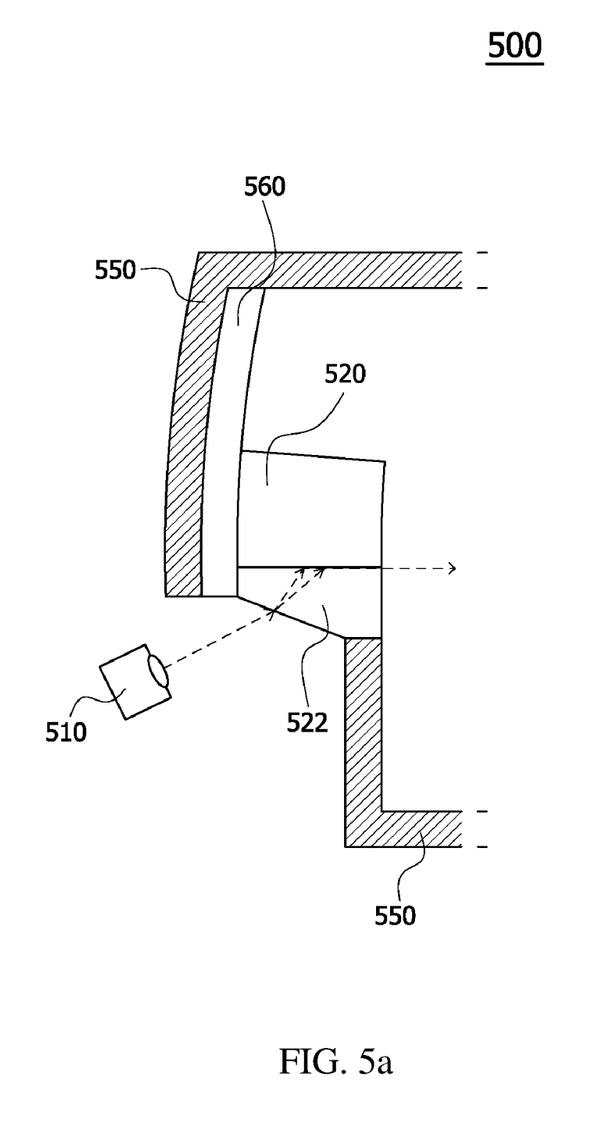
FIGS. 5A and 5B are views showing a gas concentration measuring device according to another embodiment of the present invention.
Figure 5B:
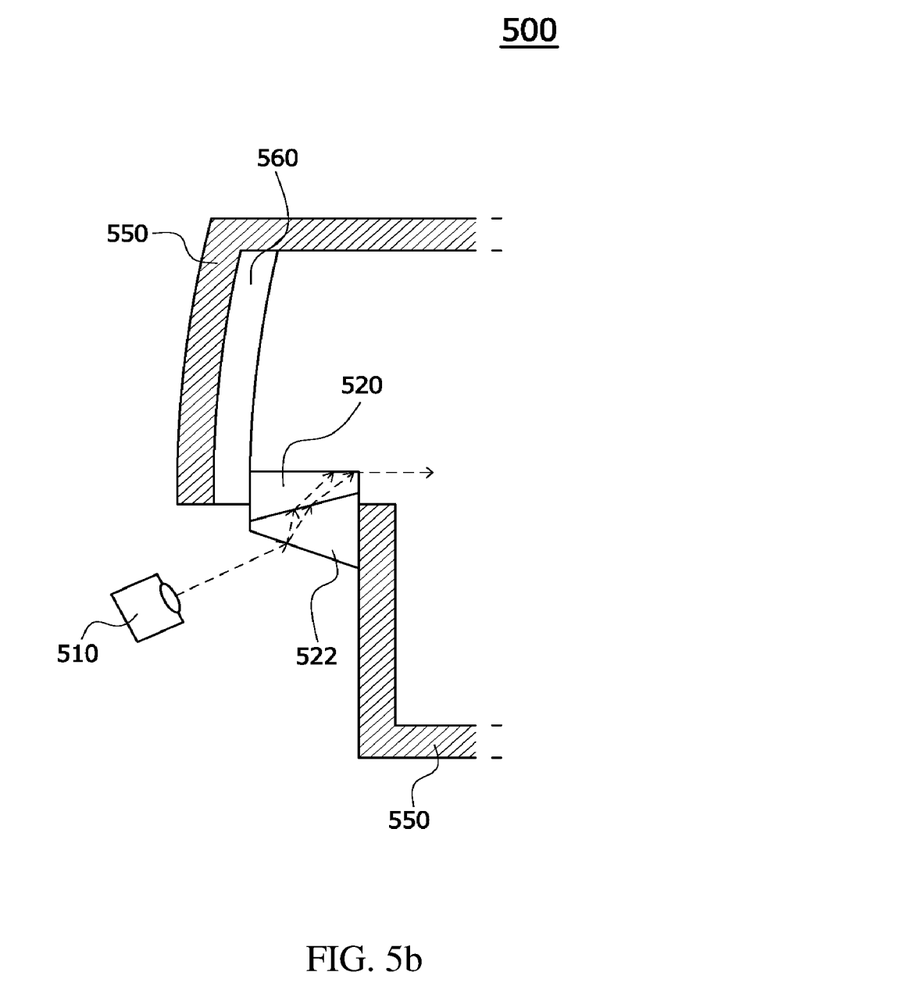

FIGS. 5A and 5B are views showing a gas concentration measuring device according to another embodiment of the present invention. Referring to FIG. 5A, the gas concentration measuring device 500 according to another embodiment of the present invention may include a light source unit 510, an incident unit 520, a chamber unit 550, and a first reflection unit 560, and not shown in FIG. 5A, but may further include a light receiving unit, a second reflection unit, a third reflection unit, and a control unit as described referring to FIGS. 1A to 2C. Because the light source unit 510, the chamber unit 550, and the first reflection unit 560 are similar to the light source unit 110, the chamber unit 150, and the first reflection unit 160 illustrated in FIG. 1A, their detailed descriptions will be omitted.

The incident unit 520 of the gas concentration measuring device 500 according to another embodiment of the present invention may include an optical dispersion compensation unit 522 to minimize dispersion of the light emitted from the light source unit 510 by wavelength. That is, the incident unit 520 may include the optical dispersion compensation unit 522 to minimize dispersion of the light like an achromatic prism so that lights with different wavelengths are emitted toward the focus F at the same refractive angle. That is, as shown in FIG. 5A, even if the light emitted from the light source unit 510 is mixed with various wavelengths or is changed into various wavelengths, the light emitted from the light source unit 510 is refracted in different ways according to the wavelengths while passing through the optical dispersion compensation unit 522 and the incident unit 520, and advances toward the third reflection unit along the same optical path. As shown in FIG. 5A, the optical dispersion compensation unit 522 may be arranged to be adjacent to the incident unit 520, and the bottom surface of the optical dispersion compensation unit 522 on which light is incident is not parallel with the top surface of the optical dispersion compensation unit 522 but is formed in a slanted direction.

Furthermore, the incident unit 520 is longer than those of the previous embodiments so that the light reflected from the third reflection unit continues to pass the incident unit 520. According to embodiments, if the top surface of the incident unit 520 extends in the direction of the third reflection unit, it reaches the focus F of the third reflection unit, and the right surface of the incident unit 520 may be an arc around the focus F of the first reflection unit 560.

In the meantime, the gas concentration measuring device 500 according to another embodiment of the present invention may include the incident unit 520 and the optical dispersion compensation unit 522, which are changed in their form as shown in FIG. 5b. In other words, the top surface and the bottom surface of the incident unit 520 are not parallel with each other but are formed in the slant direction, and the cross-section form of the optical dispersion compensation unit 522 makes an acute angle between the top surface and the bottom surface so as to be formed in a trapezoidal shape. The light refracted through the bottom surface of the incident unit 520 advances toward the third reflection unit in the gas concentration measuring device 500 shown in FIG. 5A, but the lights refracted at the bottom surface and the top surface of the incident unit 520 advance toward the third reflection unit in the gas concentration measuring device 500 shown in FIG. 5B.

Figure 6A:
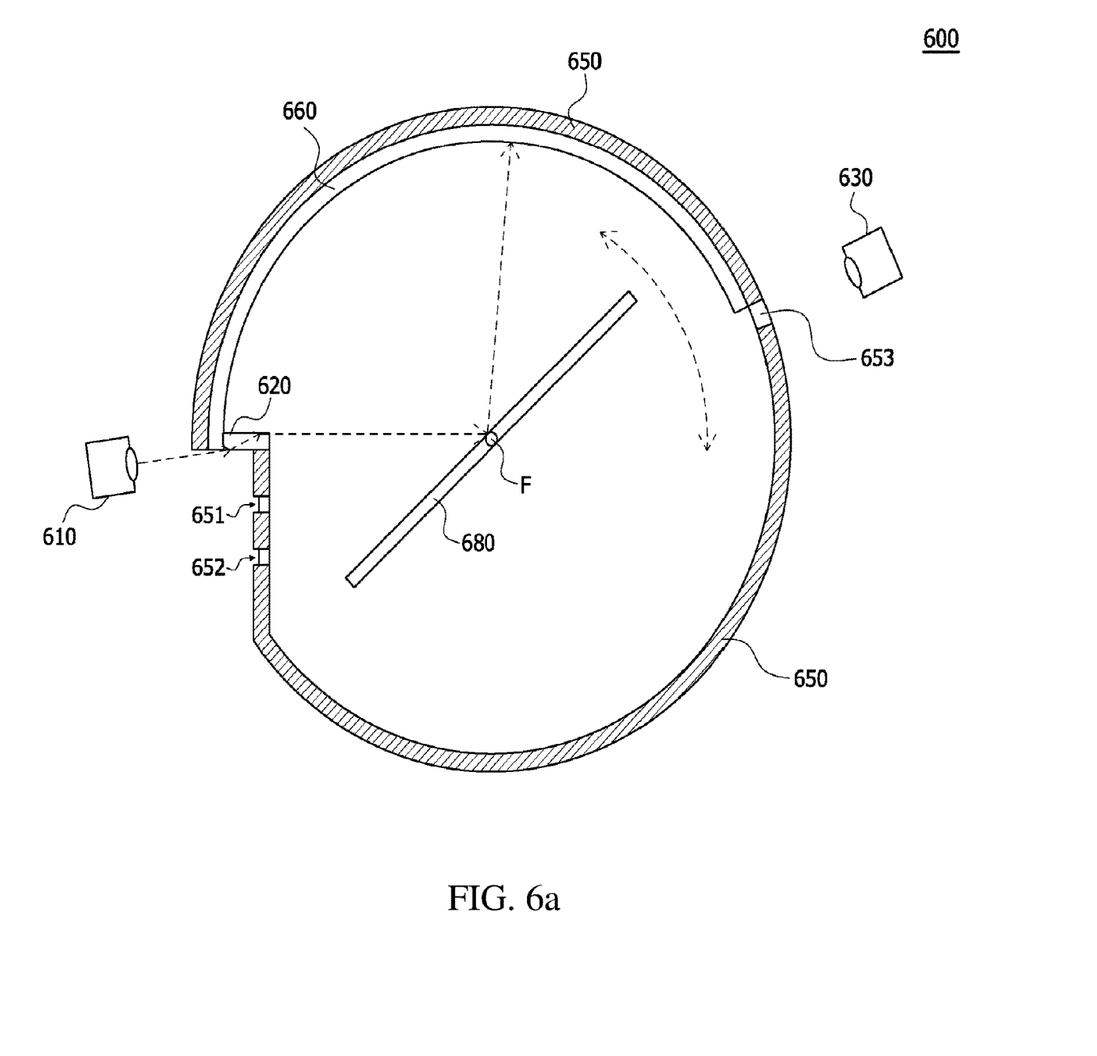
FIGS. 6A to 6C are views showing a gas concentration measuring device according to another embodiment of the present invention.
Figure 6B:
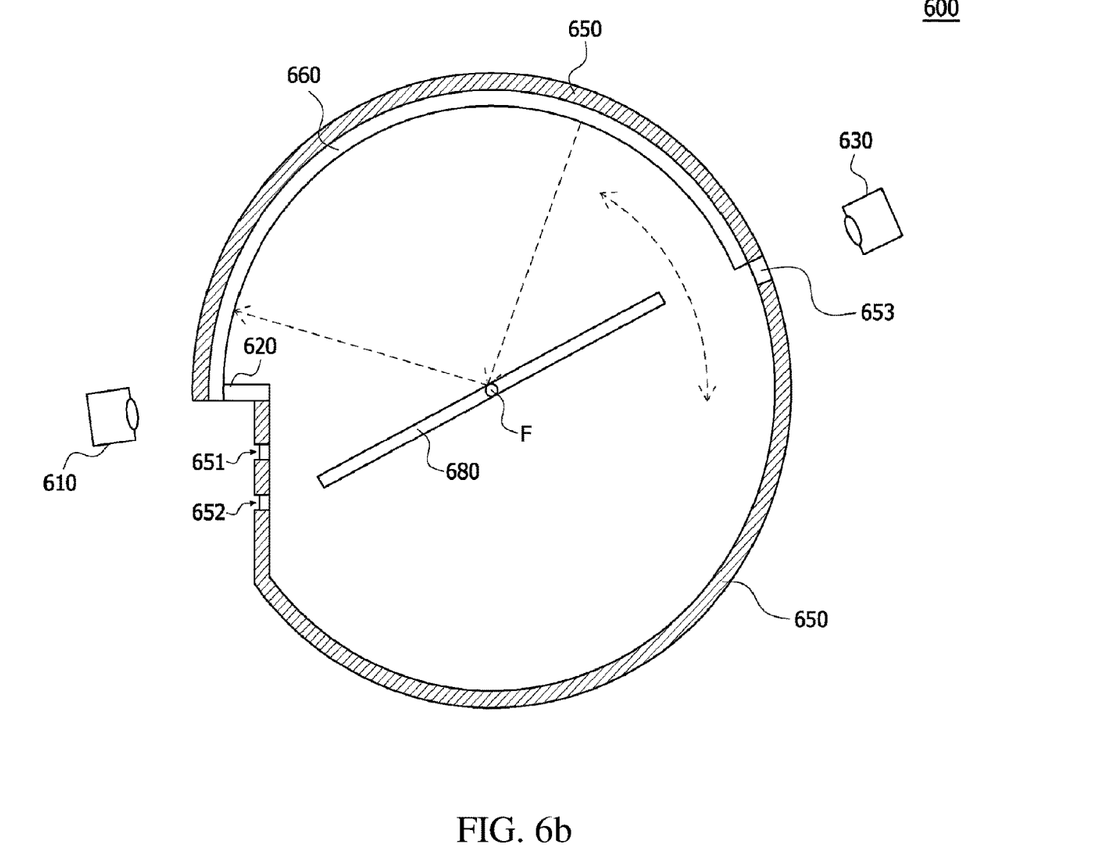
Figure 6C:
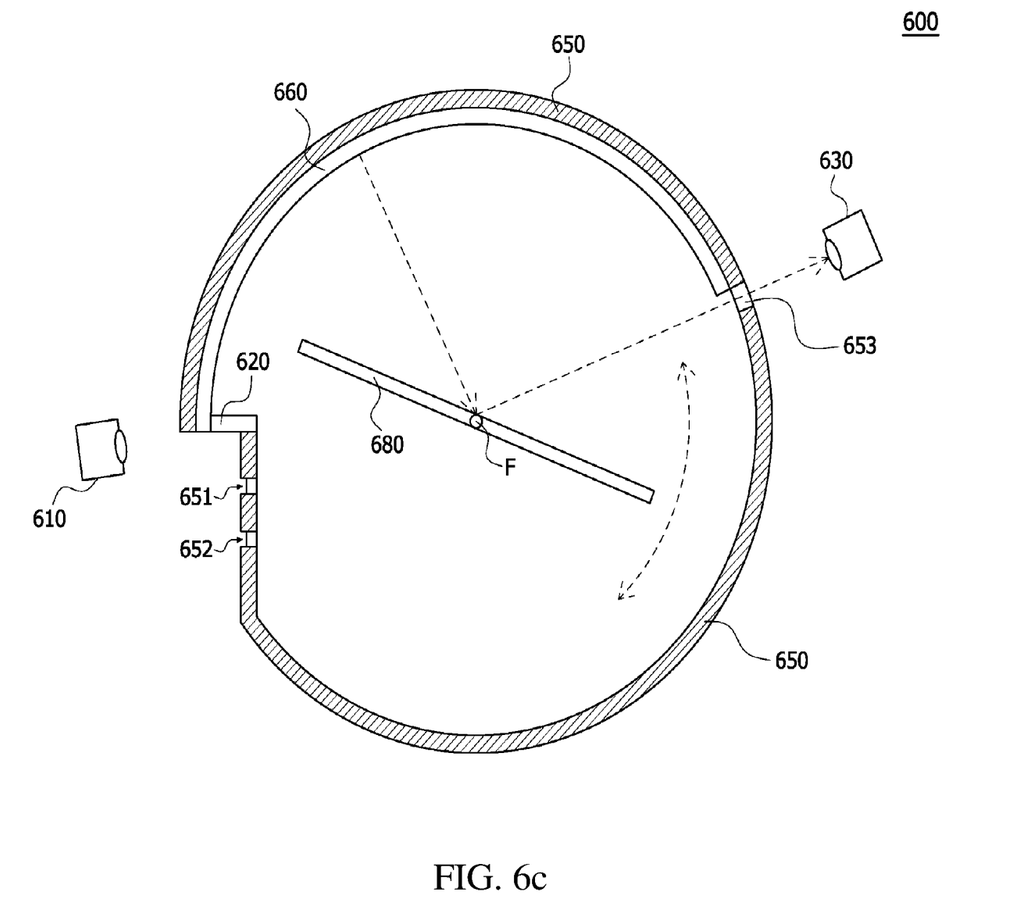

FIGS. 6A to 6C are views showing a gas concentration measuring device according to another embodiment of the present invention.

Referring to FIG. 6A, the gas concentration measuring device 600 according to another embodiment of the present invention may include a light source unit 610, an incident unit 620, a light receiving unit 630, a chamber unit 650, a gas inlet 651, a gas outlet 652, a light output hole 653, a first reflection unit 660, and a third reflection unit 680. Because the light source unit 610, the incident unit 620, the light receiving unit 630 and the third reflection unit 680 are similar to the light source unit 110, the incident unit 120, the light receiving unit 130, the gas inlet 151, the gas outlet 152, the light output hole 153 and the third reflection unit 180 illustrated in FIG. 1A, their detailed descriptions will be omitted.

Differently from the previous embodiments, the gas concentration measuring device 600 illustrated in FIG. 6A has the chamber unit 650 with a circular cross-section. So, the first reflection unit 660 attached to the inner surface of the chamber unit 650 may be a part of a circle.

That is, the first reflection unit and the second reflection unit having the same focus in the previous embodiments are formed in a single circular shape in the gas concentration measuring device 600 illustrated in FIG. 6A.

Referring to FIG. 6A, the light emitted to the inside of the chamber unit 650 through the incident unit 620 is reflected by the third reflection unit 680 located at the focus F, and faces the first reflection unit 660. After that, the third reflection unit 680 is rotated by the control unit at a predetermined angle. The light reflected by the first reflection unit 660 is reflected by the third reflection unit 680 located at the focus F, and then, is vertically incident on the first reflection unit 660.

Because the third reflection unit 680 is rotated while the reflection of the light by the first reflection unit 660 and the third reflection unit 680 is repeated, the light reflected by the first reflection unit 660 may face the third reflection unit 680 and the focus F as shown in FIGS. 6B and 6C. The control unit rotates the third reflection unit 680 to control the reflection angle of the light facing the focus F from the first reflection unit 660, so that the light reflected by the third reflection unit 680 located at the focus F faces the light output hole 653. Therefore, the light receiving unit 630 can measure the quantity of incident light after light was emitted from the light source unit 610 and passed through the chamber unit 650.

FIGS. 6A to 6C illustrate that the light incident onto the inside of the chamber unit 650 is outputted to the light receiving unit 630 through the light output hole 653 after being reflected on the first reflection unit 660 two times, but it is illustrated just as an example, and the number of times that the light incident to the inside of the chamber unit 650 is reflected on the first reflection unit 660 may be changed according to the speed of rotation and the rotation angle of the third reflection unit 680 controlled by the control unit.

Figure 7:
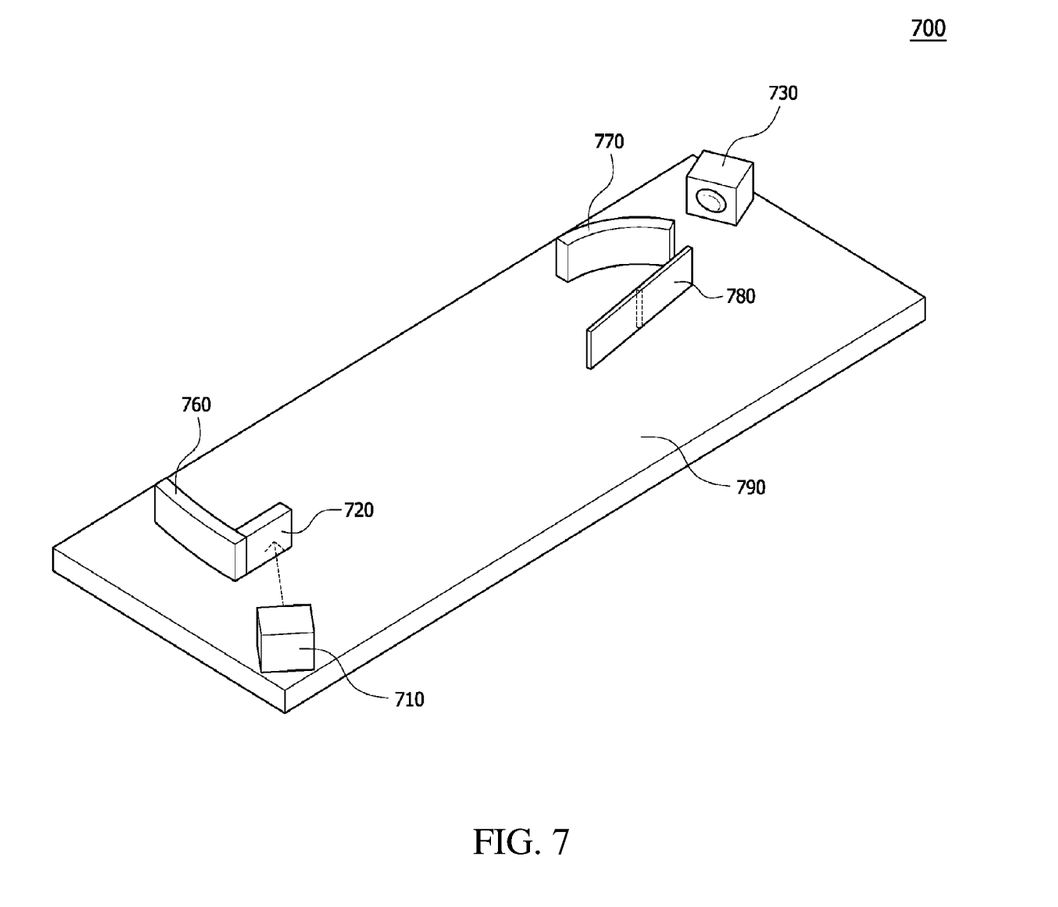
FIG. 7 is a view showing a gas concentration measuring device according to another embodiment of the present invention.

FIG. 7 is a view showing a gas concentration measuring device according to another embodiment of the present invention. Referring to FIG. 7, the gas concentration measuring device 700 according to another embodiment of the present invention may include a light source unit 710, an incident unit 720, a light receiving unit 730, a first reflection unit 760, a second reflection unit 770, a third reflection unit 780, and a base unit 790.

The gas concentration measuring device 700 illustrated in FIG. 7 does not have the chamber unit 150 of the gas concentration measuring device 100 illustrated in FIG. 1. The light source unit 710, the incident unit 720, the light receiving unit 730, the first reflection unit 760, the second reflection unit 770, and the third reflection unit 780 may be combined to the top of the base unit 790. Therefore, the gas concentration measuring device 700 does not require a gas inlet and a gas outlet, and can measure air conditions in an open space or gas concentration in the air.

As shown in FIG. 7, the base unit 790 may be formed in a flat plate shape of a predetermined size, but is not limited to the above. The incident unit 720, the first reflection unit 760, the second reflection unit 770 and the third reflection unit 780 may have a predetermined height, and a control unit (not shown) can control the incident unit 720, the light receiving unit 730 and a driving part of the third reflection unit 780.

The light incident from the light source unit 710 advances toward the third reflection unit 780 through the incident unit 720, and the light reflected from the third reflection unit 780 is reflected through the second reflection unit 770 and the first reflection unit 760, and the light is outputted to the light receiving unit 730 while the third reflection unit 780 rotates.

Because the above contents are similar to that of the first embodiment illustrated in FIG. 1A, its detailed description will be omitted.

In the meantime, the control unit according to an embodiment of the present invention may be a single processor or a single program for controlling the driving part, an incident angle control unit, a gas inlet, and a gas outlet, but the present invention is not limited to the above. The control unit may be processors or programs for individually controlling the driving part, the incident angle control unit 413, the gas inlet 151, and the gas outlet 152.

Meanwhile, the gas concentration measuring device according to the present invention may be one among various combinations of the light source unit, the incident unit, the light receiving unit, the chamber unit, the first reflection unit, the second reflection unit and the third reflection unit described above in various embodiments. Moreover, the optical paths illustrated in the drawings are all exemplary, and may be changed in various ways.

While the present invention has been particularly shown and described with reference to exemplary embodiments thereof, it is to be understood that the present invention is not limited to the exemplary embodiments, it will be understood by those skilled in the art that various modifications and improvements may be made within the scope of the present invention as defined by the appended claims, and it is to be understood that the scope of the present invention is to be construed as encompassing various modifications and improvements.

What is claimed is:

1. A gas concentration measuring device comprising:
   a light source for emitting light into a chamber of the gas concentration measuring device;
   an incident refractor for refracting the light emitted from the light source;
   a first reflector and a second reflector for reflecting light;
   a third reflector disposed in the chamber to be rotated;
   a light detector for receiving light reflected from the third reflector and measuring the received light; and
   a controller for rotating the third reflection unit within a predetermined driving range from when the light is emitted by the light source into the chamber of the gas concentration measuring device to when the light reflected from the third reflector is outputted to the light detector,
   wherein the controller is configured to change an optical path of the light emitted from the light source, such that the light refracted by the incident refractor is directed to the third reflector to be reflected thereby and then directed to the second reflector, the light reflected from the second reflector is directed back to the third reflector to be reflected thereby and then directed to the first reflector, and, by a rotation of the third reflector, the light reflected from the first reflector is directed back to the third reflector to be reflected thereby and then directed to the light detector.

2. The gas concentration measuring device according to claim 1, wherein the light reflected from the first reflector and the light reflected from the second reflector pass a same point on the third reflector.

3. The gas concentration measuring device according to claim 1, wherein each of the first reflector, the second reflector, and the third reflector has an oval shape, a circular shape, a parabolic shape, or a plane shape.

4. The gas concentration measuring device according to claim 1, wherein a focus of the first reflector and a focus of the second reflector are located on a reflective surface of the third reflector.

5. The gas concentration measuring device according to claim 1, wherein the first reflector has a plane shape, and further comprises:
   a condensing lens arranged between the first reflector and the second reflector.

6. The gas concentration measuring device according to claim 5, wherein a focus of the condensing lens is located on a reflective surface of the third reflector.

7. The gas concentration measuring device according to claim 1,
   wherein the controller is further configured to control an incident angle of the light emitted into the chamber of the gas concentration measuring device differently according to wavelengths of the emitted light.

8. The gas concentration measuring device according to claim 1, wherein the light source comprises a plurality of optical devices for emitting lights with different incident angles and different wavelengths.

9. The gas concentration measuring device according to claim 1, wherein the incident refractor is further configured to minimize dispersion of the light emitted from the light source by wavelength.

10. The gas concentration measuring device according to claim 1, wherein each of the first reflector and the second reflector has a single circular shape, and a focus of the first reflector and a focus of the second reflector coincide with each other.

* * * * *